United States Patent Office 3,761,339
Patented Sept. 25, 1973

3,761,339
LAMINATING PROCESS
Robert F. Purcell, Jerry H. Hunsucker, and David K. Sausaman, Terre Haute, Ind., assignors to Commercial Solvents Corporation
No Drawing. Filed Apr. 7, 1971, Ser. No. 132,224
Int. Cl. C08g 5/00; C09j
U.S. Cl. 156—331                          8 Claims

ABSTRACT OF THE DISCLOSURE

An improved laminating process particularly useful for laminating a structurally weak member to a structurally strong member by applying to one or both members a solution of a resinous reaction product of dimethylolpropionic acid with a lower aliphatic aldehyde and a compound selected from the group consisting of urea, phenol, alkyl phenol, and alkanolamine and mixtures thereof.

BACKGROUND OF THE INVENTION

This invention relates to an improved laminating process. In a particular aspect this invention relates to an improved process for laminating a structurally weak member to a structurally strong member.

It is known to prepare water-soluble, heat-curable, resin coating compositions by condensing 2,2-bis-(hydroxymehtyl)propionic acid (otherwise known as dimethylolpropionic acid and hereinafter designated DMPA) with an aliphatic aldehyde and a member selected from the group consisting of urea, phenol, alkyl phenol, an alkanolamine and mixtures thereof. These compositions are useful as coatings by dispersing in water in the presence of an alkaline material, e.g. an alkanolamine, applying to the article to be coated, then baking the coated article at about 200° C. Such a coating is especially useful for coating paper because the resulting coated paper is oil and water resistant, is stiff but not brittle and remains porous to the passage of air. Furthermore, the coating is nearly water-white and does not discolor the paper or other article.

It is known to produce laminates using urea (and substituted urea)-formaldehyde and phenolic-formaldehyde adducts, or prepolymers, as the laminating agent or adhesive. These formaldehyde-based prepolymers have several disadvantages. They emit noxious and toxic formaldehyde vapors during use which tend to pollute the environment; they tend to have poor package stability, and the working time after applying the prepolymer to the articles to be laminated is limited because the prepolymer slowly cures even at ordinary temperatures. Furthermore, the cured phenolic resins are dark colored and discolor the paper so that light-colored paints cannot be satisfactorily used.

Paper-laminated plywood manufactured with phenolic-formaldehyde prepolymers has been found useful for outdoor exposure. It can be easily painted with oil-based paints or exterior latex paints. It has the advantage over plywood in that the latter develops numerous cracks, even though painted, and becomes unsightly. However, in addition to the foregoing disadvantages, it has previously been necessary to laminate the paper to plywood, then to coat the paper in separate operations. A 1-step process would be advantageous.

In view of the foregoing disadvantages a need exists for an improved laminating process.

SUMMARY OF THE INVENTION

It is an object of this invention to provide an improved laminating process.

It is another object of this invention to provide an improved process for lamintaing a structurally weak member to a structurally strong member.

It is yet another object of this invention to provide water-resistant paper-to-wood laminates.

It is still yet another object of this invention to provide an improved laminating process using formaldehyde-based prepolymers which do not emit formaldehyde vapors during the laminating step.

It is a fifth object of this invention to provide an improved process for simultaneously laminating a structurally weak member to a structurally strong member while providing a durable protective coating to the structurally weak member.

A sixth object of this invention is to provide a laminating process wherein the articles to be laminated can be coated with the prepolymer than stored indefinitely before laminating.

Other objects will be apparent to those skilled in the art from the disclosure herein.

An improved laminating process has been discovered comprising the steps of: applying a dispersion of a prepolymeric composition obtained by condensing 2,2-bis (hydroxymethyl)propionic acid (otherwise known as dimethylolpropionic acid and hereinafter designated DMPA) with an aliphatic aldehyde and a member selected from the group consisting of urea, phenol, alkyl phenol, an alkanolamine and mixtures thereof, to the surfaces of the articles to be laminated, assembling said articles and subjecting said articles to elevated temperatures at above atmospheric pressure.

DETAILED DESCRIPTION

The laminating process of the present invention is broadly applicable to a wide variety of materials. Generally it is contemplated that it will be most useful for laminating a structurally weak member to a structurally strong member. The laminated articles can be of similar substances or dissimilar substances. It is contemplated that the structurally strong member can consist of steel, wood, plywood, pressed particle wood, and the like. The structurally weak member, can be paper, textile, e.g. cotton, silk, wool, viscoe rayon, cellulose acetate, nylon, polyester and mixtures thereof. It is further contemplated that the resin can be used as the adhesive in the manufacture of plywood and particle board. The terms "structurally strong" and "structurally weak" are not intended to be limiting. They are obviously relative terms and encompass many gradations of properties so that a sharp line of demarcation cannot be reasonably drawn, nor would it be advantageous for the practice of this invention to do so.

In the practice of this invention, the prepolymer is provided, preferably, in an aqueous dispersion or as a solution in a lower alkanol as described hereinafter. The prepolymer dispersion is applied to the structurally strong member by any suitable method, e.g. by dipping, brushing, spraying, calendering, doctor blade, etc., and can be permitted to dry at ambient temperatures. Similarly, the prepolymer dispersion is applied to the structurally weak member by any suitable method, preferably by dipping, and can then be allowed to dry at ambient temperatures. It is understood that drying of the members is not a necessary step in the practice of this invention. It is however a convenient one and has the advantage of allowing the two members to be coated at different times and/or different places as desired. When the structurally weak member is used wet, it is generally unnecessary to apply the prepolymer to the structurally strong member. The amount of prepolymer dispersion absorbed by the weak member will be adequate to insure a strong bond.

The members, after coating with prepolymer are laminated by methods known in the art. They are assembled in the arrangement desired, then heated to about 325–375° F., preferably about 350° F., for about 1–5 minutes under pressure sufficient to provide at least intimate contact of the contacting surfaces. Suitable pressure can be from at least 5 p.s.i.g. to 1000 p.s.i.g. or more, as is known in the art.

The prepolymers useful in the practice of the present invention are formed by reacting DMPA with an aliphatic aldehyde and a member selected from the group consisting of urea, phenol, alkyl phenol, an alkanolamine and mixtures thereof. The reaction is conducted at a pH less than about 7 in the presence of a lower aliphatic alcohol, or, preferably, water, at reflux temperature and for a period of time sufficient to effect partial, but not complete, polymerization. Thus the term prepolymer as used herein is intended to mean a partially polymerized resinous material. A preferred prepolymer is that obtained by effecting the reaction in the presence of an alkanolamine corresponding to the formula

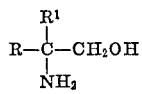

wherein R and $R^1$ can be hydrogen, methyl or ethyl and can be the same or different, or R can be hydroxymethyl.

When the reaction is complete, the reaction mixture is allowed to cool, then the pH is adjusted to within about 5 to 8, preferably within about 6 to 7, with an alkanolamine corresponding to the above formula, or with an alkyl amine corresponding to the formula

wherein $R^2$, $R^3$ and $R^4$ can be hydrogen, methyl, ethyl, propyl, isopropyl, and butyl and can be the same or different. It is known in the art to adjust the pH of resin dispersions with an alkylamine or an alkanolamine and any of the compounds previously employed can be employed to produce the dispersions of the present invention.

When pH adjustment has been effected, the dispersion is diluted with water or a lower aliphatic alcohol to a suitable concentration, e.g. about 20% by weight, as desired. The resulting composition rapidly cures, i.e., completely polymerizes, at elevated temperatures, e.g. from 300 to 400° F. Paper coated with this material is oil and water resistant, is stiff but not brittle and remains porous to the passage of air. There is no significant odor of formaldehyde during the heat-curing step.

The urea and aldehyde are generally employed in a mole ratio of, for example, about 1:2 respectively as is known in the art. The ratios are not critical and wide departures from the foregoing are permissible. The DMPA is generally employed in a ratio of about 0.5–1.5 moles of DMPA to 2 moles of urea, preferably about 1:2. The DMPA preferably is not employed at ratios higher than 1.5:2 because the mixture may gel and become unusable. When the reaction is effected in the presence of an alkanolamine, as set forth hereinbefore, it is employed in a mole ratio of about 1:1 of urea. Suitable alkanolamines include, but are not limited to, 2-amino-2-methyl-1-propanol, 2-amino-1-butanol, 2-amino-2-methyl-1,3-propanediol, and 2-amino-2-ethyl-1,3-propanediol.

Other prepolymers useful for the practice of this invention are those obtained by reacting DMPA with phenol, or with a mixture of phenol and alkylated phenol, and an aliphatic aldehyde. After the reaction is effected, the pH is adjusted as hereinbefore described and the dispersion is diluted to a suitable concentration. A prepolymer of this type cures rapidly at elevated temperatures and there is no significant odor of formaldehyde during the heat-curing step.

The formaldehyde and phenol can be employed in any of the proportions known in the art. Generally, however, they are employed in approximately a 1:1 mole ratio, but the amounts are not critical. The DMPA is employed in a mole ratio of about 0.5 to 1.5 per 2 moles of phenol, preferably about 1:2. Alkyl phenol is used to replace a portion of the phenol when desired, as is known in the art.

The DMPA, alkanolamines and phenols used in preparing the resins suitable for the practice of this invention are commercially available and the usual commercial grades are suitable for preparing the present compositions.

Aldehydes suitable for use in preparing the resins include, but are not limited to, the lower aliphatic aldehyde, e.g. formaldehyde, acetaldehyde, propionaldehyde and butyraldehyde. These aldehydes are commercially available and the usual commercial grades are suitable. The formaldehyde can be used as the usual 37% by weight grade or the 44% or higher grades are also suitable, as are the alkanol solutions and paraformaldehyde.

The foregoing description of the invention can be better understood with reference to the following examples. It is understood, however, that the examples are for the purposes of illustration and it is not intended to be limited thereby.

Example 1

Urea, 60 g. (1 mole), and formaldehyde, 61 g. (about 2 mole, provided by 165 g. of a 37% solution) and isopropyl alcohol, about 30 g., were charged to a reaction vessel equipped with a thermometer, stirrer and reflux distillation column. The mixture was stirred until the urea dissolved, then DMPA, 134 g. (about 1 mole), was added. The mixture was heated at reflux for 2 hours. It was then cooled and the pH was adjusted with 2-amino-2-methyl-1-propanol to about 6.0. The product was a water-white prepolymer dispersed in aqueous isopropyl alcohol solution. The viscosity was J, Gardner. The resin solution was diluted to 20% by weight with isopropyl alcohol. A sample of fir plywood panel was treated with sufficient prepolymer dispersion to wet one surface of the panel but without excess. About 0.1 ml. per square inch was applied. A sample of white filter paper was dipped in the solution, passed between rollers to remove excess, and was then applied manually to the plywood. The assembled article was heated under pressure in a suitable press at 350° F. for about 2 minutes. No odor of formaldehyde was detected. The laminate was then removed from the press and allowed to cool. A strong bond was formed at the plywood surface. The exposed paper surface was smooth and free from discoloration. It showed excellent water resistance.

Example 2

Urea, 30 g. (0.5 mole), formaldehyde, 59.2 g. (160 g. of 37% aqueous solution, about 1 mole), methanol, 45 g., and 2-amino-2-ethyl-1,3-propanediol (AEPD), 59.5 g. (about 0.5 mole) was charged to a reaction vessel equipped with a stirrer, reflux condenser and thermometer. The mixture was heated at reflux temperature for an hour, with continuous stirring, then dimethylolpropionic acid, 33.5 g. (about 0.25 mole), was added and heating was continued at reflux (about 55° C.) for another hour. The mixture was then neutralized to a pH of about 6.5 with 2-amino-2-ethyl-1,3-propanediol giving a dispersion of prepolymer in aqueous methanol. The color was 3, Gardner, and the viscosity was A.

A sample of the prepolymer solution is applied to a steel panel as about a 1.5 mil wet film and is allowed to dry at ambient temperatures. A sample of uncoated air filter paper is dipped into the prepolymer solution, then passed through a roller to remove excess solution. It is placed in contact with the steel panel and the assembled article is heated in a press at 190° C. under pressure for 4 minutes. No odor of formadlehyde is detected in the environment. The resulting laminate is white in color and smooth in appearance. It was painted with a conventional oil paint which dried to a smooth, pleasing finish. It was determined to be useful as a decorative or structural element in architectural applications.

Example 3

The experiment of Example 1 was repeated in all essential details except that 67 g. of DMPA (about 0.5 mole) was substituted for 1 mole, and 111 g. of butanol was substituted for isopropyl alcohol. After heating at reflux for 2 hours, 98 ml. of the water-butanol azeotrope was separated by distillation over a period of 1.5 hours. The mixture was then cooled and the pH was adjusted to about 6.5 with 2-amino-2-ethyl-1,3-propanediol. There was obtained a 51% by weight dispersion of resin in aqueous butanol. It had a color, Gardner, of 1, a viscosity, Gardner, of G to H, and an acid value of 87. The solution was then diluted to 20% by weight with butanol.

The laminating experiment of Example 1 is repeated in all essential details except that a sheet of non-woven textile (paper) is substituted for air-filter paper. The expected results were obtained.

Example 4

The experiment of Example 2 was repeated in all essential details except 55 g. of butanol was substituted for methanol and 22 g. of acetaldehyde (0.5 mole) was substituted for AEPD.

After the DMPA was added, heating at reflux was continued for another hour, as before, then 63 ml. of butanol-water azeotrope was removed by distillation, and another 126 g. of butanol were added. Heating was continued for 50 minutes and another 126 ml. portion of butanol-water azeotrope was removed by distillation. The reaction mixture was then cooled and the pH was adjusted to about 6 with AEPD. There was obtained a solution of prepolymer in butanol having a Gardner viscosity of A-3, and a Gardner color of 1. It was diluted to 20% with butanol.

The laminating experiment of Example 1 is repeated in all essential details except that a panel of pressed particle board (Masonite) is substituted for the plywood and burlap is substituted for the filter paper. The laminated article has a pleasing appearance, suitable for ornamental architectural use.

Example 5

The experiment of Example 2 was repeated in all essential details except that isobutyl alcohol was substituted for n-butanol.

After adding the DMPA, heating at reflux was continued for one hour. Then, over a period of 45 minutes, 115 ml. of the isobutyl alcohol-water azeotrope was removed and the resin solution was then cooled. It had a color, Gardner, of 3 and a viscosity of A.

The laminating experiment of Example 1 is repeated in all essential details except that a panel of pressed particle board (Masonite) is substituted for the plywood and a coarse woven woolen fabric is substituted for the filter paper. The laminated article has a pleasing appearance, suitable for ornamental architectural use.

Example 6

The experiment of Example 1 was repeated in all essential details except that 90 g. urea (1.5 mole), 25 g. DMPA (about 0.2 mole), 177 g. AEPD (about 1.5 mole) and 1200 g. isopropyl alcohol were used. The mixture was heated under reflux for 45 minutes. The pH was then adjusted to about 6.2 with AEPD and diluted to 20% with isopropyl alcohol. It was determined that it was suitable for simultaneous use as a paper coating and for laminating the paper to plywood.

Example 7

There was delivered to a reaction vessel equipped with a stirring means and a reflux distillation column with take-off head, 95 g. phenol (1 mole), 162 g. of 37% HCHO (about 1 mole) and 67 g. DMPA (0.5 mole). The mixture was heated to reflux temperature (about 100° C.) for 4 hours. Then 66 ml. of water and excess formaldehyde were separated by distillation and the mixture was allowed to cool to room temperature. The pH was then adjusted to about 6 with 28.5 g. of 2-amino-2-methyl-1-propanol (AMP). The initial pH before adjustment was about 2. The above solution had a solids content of 87%, color of 3, Gardner scale, a viscosity of U–V, Gardner, and an acid value of about 95.

The solution is suitable for use in simultaneously coating paper and laminating the paper to plywood.

Example 8

The experiment of Example 7 was repeated in all essential details except that 72 g. phenol was substituted for 94 g., and in addition there was added 41 g. t-amyl phenol.

After the reflux period 51 ml. of formaldehyde-water mixture was separated by distillation. After cooling to room temperature, the reaction mixture was neutralized to a pH of 6 by adding 14 g. of AMP. The resulting solution had a solids content of 80.3% by weight, a color, Gardner, of 3, a viscosity, Gardner, of D, and an acid value of 65.9.

The laminating experiment of Example 1 is repeated in all essential details except that a panel of pressed particle board (masonite) is substituted for the plywood and a woven fabric of polyester (Dacron) was substituted for the filter paper. The laminated article has a pleasing appearance, suitable for ornamental architectural use.

Exmple 9

To a reaction vessel equipped with a distillation column, a heat source, an agitation means and a temperature sensing means, there were delivered 75 lb. of urea, 350 lb. of 37% formaldehyde solution, 48 lb. of AEPD, and 21 lb. of DMPA. No additional solvent was added. The mixture was stirred for 15 minutes and the ingredients all dissolved readily in the water accompanying the formaldehyde.

The mixture was gradually heated and after about 1 hour the temperature was 193° F. and reflux conditions had become established. After heating under reflux for about 40 minutes, take-off of water was started. Four hours after reflux had started, 120 lb. of water had been removed and the reaction was determined to be complete. The mixture was allowed to cool to ambient temperature and the solids content was determined to be 73.1% by weight. The pH was 5.2.

To the foregoing solution or dispersion there was added 65 lb. AEPD and the resulting pH was 6.8. After standing overnight the pH was 6.0.

The prepolymer solution had the following additional properties:

Solids, percent by wt. ............................ 70
Density, lb./gal. .................................. 10
Acid value ........................................ 3
Color, Gardner .................................... 2
Viscosity, Gardner ................................ <A
Free formaldehyde, percent ....................... 1.3
Turbidity Clear
Odor None
Solubility in water Miscible
Water resistance: No odor of formaldehyde after 1 hour in boiling water.

The prepolymer obtained by the foregoing experiment is used in a process for the manufacture of plywood. It is diluted to about 20% solids with water and applied liberally with a roller to ⅛ in. sheets of fir by known methods. The fir sheets are assembled in a suitable heated press and heated under pressure at 350° F. for 4 minutes. The resulting laminate is water-resistant and no odor of formaldehyde is detected during the heating step.

What is claimed is:

1. In a process for laminating a plurality of members by treating the to-be-laminated surfaces of said members with a heat-curable prepolymer condensation product, assembling said members and heating said assembled members under pressure at about 350° F. for about 1–5 minutes, the improvement consisting of using as said prepolymer a condensation product of dimethylolpropionic acid with a lower aliphatic aldehyde and a member selected from the group consisting of urea, an alkanolamine, phenol, alkyl phenol and mixtures thereof said condensation product being effected in acid medium.

2. The process of claim 1 wherein said heat-curable prepolymer composition is the condensation product of dimethylolpropionic acid, urea and a lower aliphatic aldehyde.

3. The process of claim 2 wherein said dimethylolpropionic acid is present in a ratio of about 0.5 to 1.5 moles per 2 moles of urea.

4. The process of claim 3 wherein said dimethylolpropionic acid is present in a ratio of about 1 mole per 2 moles of urea.

5. The process of claim 2 using as said prepymer the condensation product of claim 2 wherein said condensation is effected in the presence of an alkanolamine corresponding to the formula

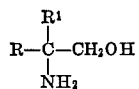

wherein R and R¹ are the same or different and are selected from the group consisting of hydrogen, methyl and ethyl and R can additionally be hydroxymethyl.

6. The process of claim 2 wherein said aldehyde is acetaldehyde.

7. A process for laminating a weak structural member to a strong structural member, by treating the to-be-laminated surfaces of said members with a heat-curable prepolymeric condensation product, assembling said members and heating said assembled members under pressure at about 350° F. for about 1–5 minutes, consisting of using as said condensation product the prepolymeric condensation product of dimethylolpropionic acid with phenol, or alkyl phenol or mixture thereof, and a lower aliphatic aldehyde said condensation product being effected in acid medium.

8. The process of claim 7 wherein said resin is the condensation product of dimethylolpropionic acid, phenol and formaldehyde wherein the dimethylolpropionic acid is employed in a ratio of about 0.5–1.5 per 2 moles of phenol.

References Cited
UNITED STATES PATENTS

| | | | |
|---|---|---|---|
| 2,898,324 | 8/1959 | MacKay | 260—67.6 |
| 3,483,075 | 12/1969 | Schmitt | 161—227 |
| 3,535,185 | 10/1970 | Tueter et al. | 156—335 |
| 3,627,627 | 12/1971 | Nobell et al. | 161—209 |

GEORGE F. LESMES, Primary Examiner

M. B. WITTENBERG, Assistant Examiner

U.S. Cl. X.R.

156—327, 335; 260—55, 57 A, 68, 70; 161—268, 220, 232

PO-1050
(5/69)

UNITED STATES PATENT OFFICE
CERTIFICATE OF CORRECTION

Patent No. 3,761,339   Dated September 25, 1973

Inventor(s) R. F. Purcell, J. H. Hunsucker and D. K. Sausaman

It is certified that error appears in the above-identified patent and that said Letters Patent are hereby corrected as shown below:

Column 1, line 27, "mehtyl" should be --methyl--
Column 1, line 71, "lamintaing" should be --laminating--
Column 2, line 14, "than" should be --then--
Column 2, line 40, "viscoe" should be --viscose--
Column 4, line 70, "formadlehyde" should be --formaldehyde--

Signed and sealed this 9th day of April 1974.

(SEAL)
Attest:

EDWARD M. FLETCHER, JR.
Attesting Officer

C. MARSHALL DANN
Commissioner of Patents